United States Patent
Sasaki et al.

(10) Patent No.: US 11,333,619 B2
(45) Date of Patent: May 17, 2022

(54) MEASUREMENT X-RAY CT APPARATUS

(71) Applicant: MITUTOYO CORPORATION, Kanagawa (JP)

(72) Inventors: Seiji Sasaki, Kanagawa (JP); Nobuyuki Nakazawa, Kanagawa (JP); Hisayoshi Sakai, Kanagawa (JP); Masato Kon, Kanagawa (JP); Hidemitsu Asano, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 17/011,411

(22) Filed: Sep. 3, 2020

(65) Prior Publication Data
US 2021/0072168 A1    Mar. 11, 2021

(30) Foreign Application Priority Data
Sep. 6, 2019    (JP) .............................. JP2019-163422

(51) Int. Cl.
  *G01N 23/00*    (2006.01)
  *G01N 23/046*    (2018.01)
  *G06T 7/00*    (2017.01)
(52) U.S. Cl.
  CPC ......... *G01N 23/046* (2013.01); *G06T 7/0004* (2013.01); *G06T 2207/10081* (2013.01); *G06T 2211/40* (2013.01)
(58) Field of Classification Search
  CPC ......... G01N 2223/309; G01N 2223/33; G01N 2223/646; G01N 23/046; G01N 2223/303;
(Continued)

(56) References Cited

U.S. PATENT DOCUMENTS

| | | | |
|---|---|---|---|
| 7,352,840 B1* | 4/2008 | Nagarkar ............... | A61B 6/032 250/363.02 |
| 2004/0252810 A1* | 12/2004 | Tsujii ................... | A61B 6/4085 378/207 |

(Continued)

FOREIGN PATENT DOCUMENTS

| | | |
|---|---|---|
| JP | 2012-112790 | 6/2012 |
| JP | 2012-189517 | 10/2012 |

*Primary Examiner* — Irakli Kiknadze
(74) *Attorney, Agent, or Firm* — Greenblum & Bernstein, P.L.C.

(57) ABSTRACT

A measurement X-ray CT apparatus calibrates a geometrical positional relationship between a focus of an X-ray source, an X-ray detector, and a rotation center of a rotating table in advance. The measurement X-ray CT apparatus then obtains projection images by irradiating the object to be measured with X-rays to perform a CT scan, and generates a three-dimensional image of the object to be measured by CT reconstruction of the projection images. The measurement X-ray CT apparatus further includes a reference frame that is made of a material and has a structure less susceptible to environmental changes, and sensors that are located on the reference frame and intended to successively obtain calibration values of the geometrical positional relationship between the focus of the X-ray source and the X-ray detector during the CT scan. The calibration values are used as parameters of the CT reconstruction.

11 Claims, 10 Drawing Sheets

(58) Field of Classification Search
CPC ....... G01N 2223/401; G01N 2223/419; G01N 23/083; G01N 2223/04; G01N 2223/5015; G01N 2223/3306; G01N 2223/3035; G01N 2223/1016; G01N 2223/3307; G06T 2207/10081; G06T 2211/40; G06T 7/0004; G06T 7/60; G06T 7/80; G06T 5/006; G06T 2207/30208; G06T 11/006; G06T 11/005; G06T 2211/412; G06T 2207/20; G06T 2211/424; G06T 2207/10116; G06T 7/0012; G06T 7/30; G06T 9/002; G06T 11/003; G06T 2207/30108; G06T 2207/30168; A61B 2560/0252; A61B 2562/0219; A61B 5/02055; A61B 5/02438; A61B 5/0533; A61B 5/1118; A61B 5/14551; A61B 6/582; A61B 6/5205; A61B 6/032; A61B 6/547; A61B 6/08; A61B 5/0075; A61B 6/502; A61B 5/4312; A61B 6/4225; A61B 6/52; A61B 6/027; A61B 6/4085; A61B 6/5258; G01B 15/00; G01B 21/045; H04N 19/176; H04N 19/96; G06N 20/00; G06N 20/10; G06N 3/08; G01T 7/005; G01T 1/1611; G01T 1/1615; G01T 1/2985; G01V 5/005
USPC .......................................... 378/4, 19, 207, 20
See application file for complete search history.

(56) References Cited

U.S. PATENT DOCUMENTS

| | | | |
|---|---|---|---|
| 2013/0026353 A1* | 1/2013 | Yan | A61B 6/583 |
| | | | 250/252.1 |
| 2014/0072095 A1* | 3/2014 | Feser | G01N 23/223 |
| | | | 378/4 |
| 2015/0160354 A1* | 6/2015 | Mertens | G01N 23/046 |
| | | | 378/9 |
| 2017/0112462 A1* | 4/2017 | O'Hare | G01T 7/005 |
| 2020/0141884 A1* | 5/2020 | Goto | G01N 23/046 |

* cited by examiner

Fig. 1

PRIOR ART

Fig. 2

PRIOR ART

MEASUREMENT X-RAY CT APPARATUS

CROSS-REFERENCE TO RELATED APPLICATION

The disclosure of Japanese Patent Application No. 2019-163422 filed on Sep. 6, 2019 including specifications, drawings and claims is incorporated herein by reference in its entirety.

TECHNICAL FIELD

The present invention relates to a measurement X-ray CT apparatus for industrial products. In particular, the present invention relates to a measurement X-ray CT apparatus that can measure dimensions of an entire object to be measured, including its internal structure, with high precision even if a geometrical positional relationship between the focus of an X-ray source, an X-ray detector, and the like changes from when calibrated.

BACKGROUND ART

Measurement X-ray CT apparatuses have heretofore been used to observe and inspect voids in casting parts, welding defects in welded parts, and defects in electronic parts, which are difficult to identify from external appearance. Meanwhile, the prevalence of 3D printers in recent years is boosting demand for 3D dimension measurement inside workpieces and enhancement of its precision. To meet such a demand, measurement X-ray CT apparatuses taking length traceability into account have been developed. A variety of inventive contrivances inspired by and following such a trend are also being made to meet the demand for dimension measurement with higher precision.

Figure 1:
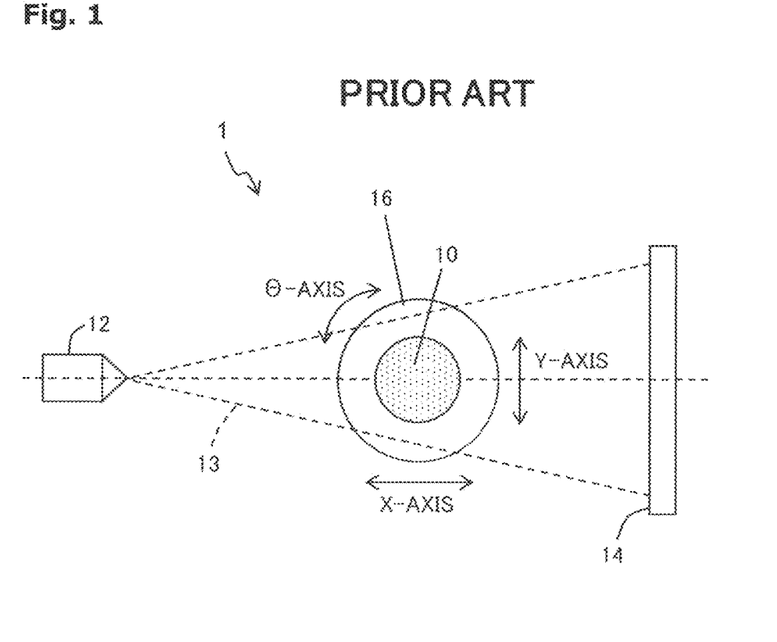
FIG. 1 is a plan view showing a configuration of essential parts of a conventional measurement X-ray CT apparatus.
Figure 2:
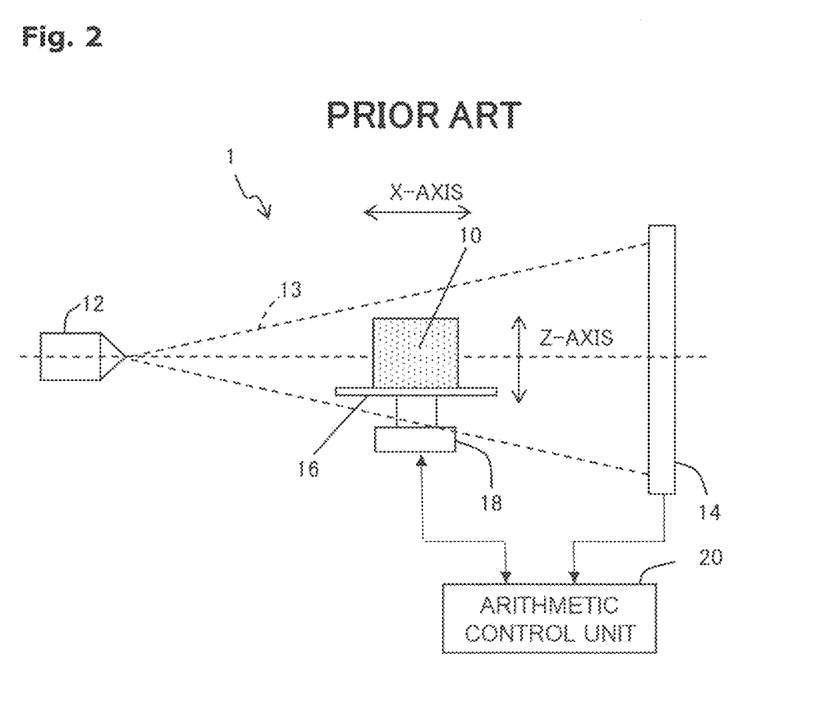
FIG. 2 is a side view of the same.

FIG. 1 (plan view) and FIG. 2 (side view) show a configuration example of a conventional measurement X-ray CT apparatus. The measurement X-ray CT apparatus 1 includes an X-ray source 12, an X-ray detector 14, a rotating table 16, a scanning mechanism 18, and an arithmetic control unit 20 (see FIG. 2) as main components. The X-ray source 12 emits X-rays. An example of the X-ray source 12 is an X-ray tube. The X-ray detector 14 detects an X-ray beam 13 that is emitted from the X-ray source 12 and transmitted through the periphery and interior of a work 10 that is an object to be measured, and renders a projection of the work 10 into a projection image. An example of the X-ray detector 14 is a flat panel display. The rotating table 16 is located between the X-ray source 12 and the X-ray detector 14, and the work 10 is placed on the rotating table 16. The scanning mechanism 18 moves the rotating table 16 to a given position in a measurement space region.

In FIG. 1, the horizontal direction from the X-ray source 12 toward the X-ray detector 14 is referred to as an X-axis, and a direction perpendicular to the X-axis is referred to as a Y-axis. A direction perpendicular to the XY plane is referred to as a Z-axis.

The rotating table 16 can be moved by the scanning mechanism 18 in the X-, Y-, and Z-axis directions, with the work 10 placed thereon. The rotating table 16 can rotate the work 10 about a θ-axis. By such adjustments, the projection image of the work 10 obtained by the X-ray detector 14 can be adjusted in position and magnification.

To obtain a three-dimensional image or volume data (CT image) of the work 10, which is the ultimate goal of the measurement X-ray CT apparatus 1, a CT scan is performed on the work 10.

Figure 3:
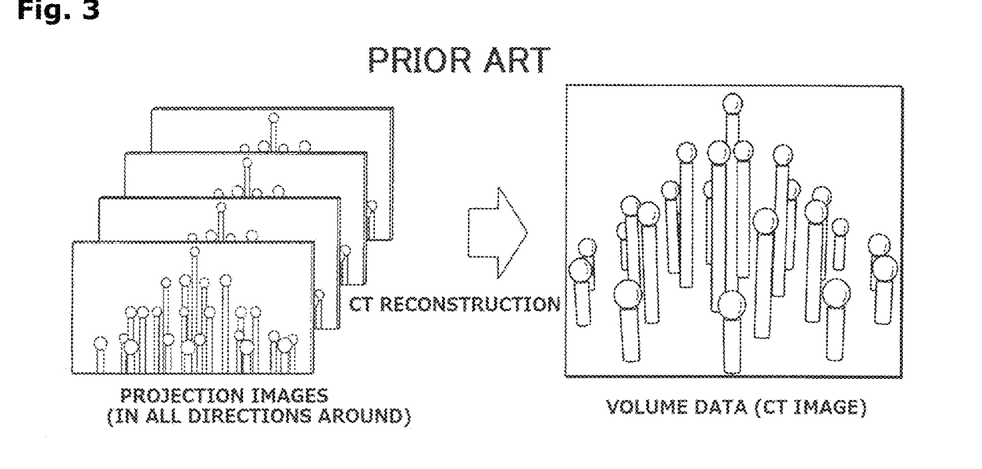
FIG. 3 is a diagram showing an outline of CT reconstruction of the same.

As shown in FIG. 3, a CT scan includes two processes, namely, acquisition of projection images of the work 10 and CT reconstruction. In the projection image acquisition process, the rotating table 16 with the work 10 placed thereon is continuously rotated at a constant speed or intermittently rotated in constant step widths during X-ray irradiation, whereby projection images of the work 10 in all directions around (constant intervals) are obtained. The volume data of the work 10 is obtained by performing CT reconstruction on the obtained projection images in all directions around (constant intervals) by using a CT reconstruction algorithm such as back projection and iterative reconstruction.

The obtained volume data can be used to perform various measurements such as dimension measurement and defect analysis.

In order for the foregoing measurement X-ray CT apparatus to perform dimension measurement with higher precision, it is important to perform various types of calibration specific to the apparatus before start of measurement. For example, Japanese Patent Application Laid-Open No. 2012-189517 describes a calibration method and an evaluation method of an X-ray CT apparatus using a standard gauge for calibration and evaluation.

A geometrical positional relationship between the focus of the X-ray source 12, the X-ray detector 14, and the rotation center of the rotating table 16 is calibrated in advance. The measurement X-ray CT apparatus 1 then obtains projection images by irradiating the work 10 with the X-ray beam 13 to perform a CT scan, and generates volume data of the work 10 by CT reconstruction of the projection images.

SUMMARY OF INVENTION

Technical Problem

The geometrical positional relationship between the focus of the X-ray source 12, the X-ray detector 14, and the like is known to change slightly from when calibrated, because of the effect of heat generation by various devices and variations in the surrounding environment. Such a change adversely affects the quality (image quality and geometrical precision) of the volume data.

Japanese Patent Application Laid-Open No. 2012-112790 describes capturing an image of markers attached to a rotating table with an optical camera, and correcting deviations of projection data in position and angle due to rotation accuracy. However, such a technique can only correct deviations due to the rotation accuracy, and has had a problem of failing to provide a sufficient effect since no reference frame is used.

The present invention is achieved in view of the foregoing problem, and an object thereof is to enable high-precision X-ray CT measurement of the dimensions of an entire object to be measured, including its internal structure, even if the geometrical positional relationship between the focus of the X-ray source, the X-ray detector, and the like changes from when calibrated.

Solution to Problem

The present invention solves the foregoing problem by the provision of a measurement X-ray CT apparatus including a rotating table for an object to be measured to be placed on and a scanning mechanism that is capable of moving the rotating table to a given position in a measurement space region. The rotating table and the scanning mechanism are located between an X-ray source and an X-ray detector. The measurement X-ray CT apparatus is configured to calibrate a geometrical positional relationship between a focus of the X-ray source, the X-ray detector, and a rotation center of the rotating table in advance, obtain projection images by irradiating the object to be measured with X-rays to perform a CT scan, and generate a three-dimensional image of the object to be measured by CT reconstruction of the projection images. The measurement X-ray CT apparatus further includes a reference frame that is made of a material and has a structure less susceptible to an environmental change, and a sensor that is located on the reference frame and intended to successively obtain calibration values of the geometrical positional relationship between the focus of the X-ray source and the X-ray detector during the CT scan. The calibration values are used as parameters of the CT reconstruction.

The reference frame may be disposed at positions of the X-ray source and the X-ray detector with the rotating table interposed therebetween.

The reference frame may be a metrology frame of rectangular solid shape.

The reference frame may be disposed at positions of the rotating table and the X-ray source, and a marker disposed on the X-ray detector may be detected by a camera disposed on the reference frame.

The reference frame may be a metrology frame of cubic shape.

The marker may be a light-emitting diode.

The reference frame may be disposed at the position of the X-ray source, and a corner cube disposed on the X-ray detector may be detected by a laser interferometer disposed on the reference frame.

An eccentricity measuring device may be disposed on the rotating table, and a sensor configured to detect a position of the eccentricity measuring device may be disposed on the reference frame.

A reference surface for eccentricity measurement may be formed on an outer periphery of the rotating table.

A sensor configured to detect a position of the rotating table may be located on the reference frame.

The sensor may be a laser tracker configured to detect a cat eye reflector disposed on a measurement object fixing jig on the rotating table.

Advantageous Effects of Invention

According to the present invention, high-precision X-ray CT measurement of the dimensions of an entire object to be measured, including its internal structure, can be performed even if the geometrical positional relationship between the focus of the X-ray source, the X-ray detector, and the like changes from when calibrated. This enables high-precision analysis because of improved quality of volume data, and can enhance measurement precision by the application of X-ray CT.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

Embodiments of the present invention will be described in detail below with reference to the drawings. It should be noted that the present invention is not limited to the contents described in the following embodiments and practical examples. The components of the embodiments and practical examples described below may include ones easily conceivable by those skilled in the art, substantially identical ones, and ones within the range of equivalency. The components disclosed in the embodiments and practical examples described below may be combined as appropriate, and may be selected and used as appropriate.

Figure 4:
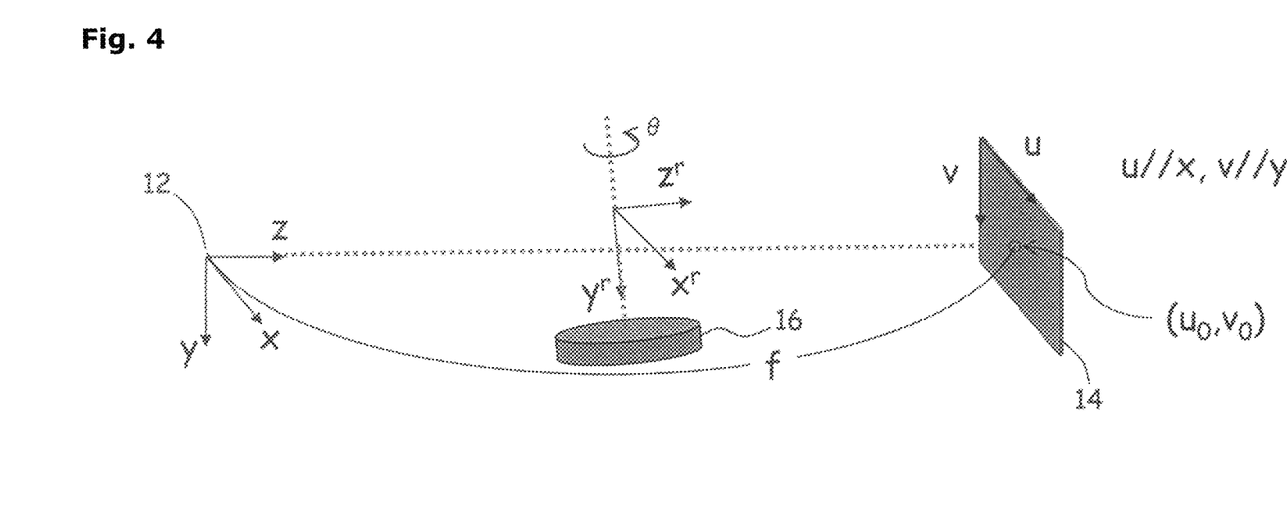
FIG. 4 is a diagram showing a basic concept of the present invention.

FIG. 4 shows a geometrical model of a measurement X-ray CT apparatus.

Parameters that can change during a CT scan include rotations (3) and translations (3) about the orientation of a rotating table 16, and focal lengths f (2), skew (1), and center positions (2) about an X-ray detector (camera model) 14 (the parenthesized numbers indicate the numbers of parameters corresponding to the respective degrees of freedom). In the present invention, high-precision X-ray CT measurement is achieved by constantly inspecting changes in the parameters during a CT scan.

Figure 5:
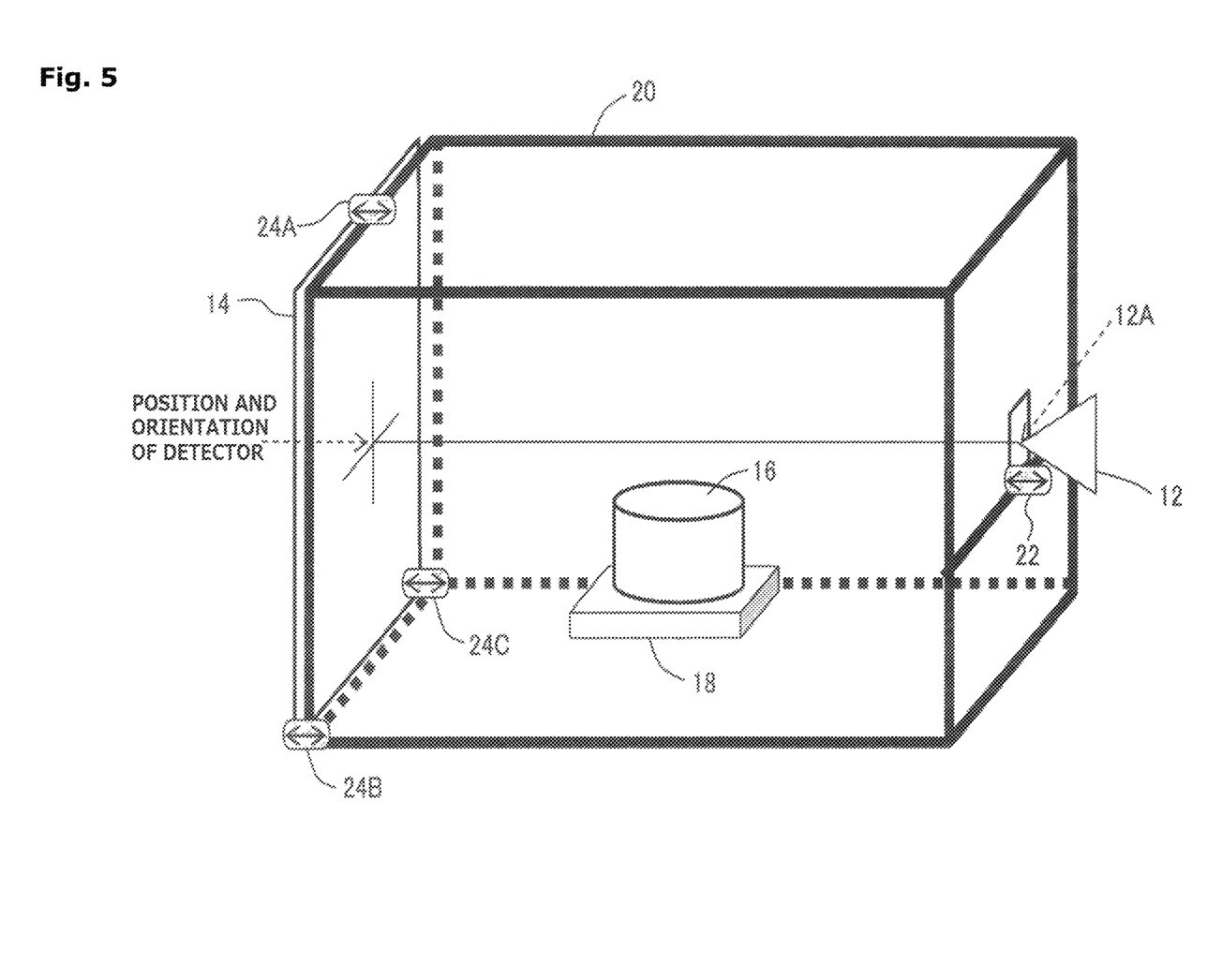
FIG. 5 is a perspective view showing a first embodiment of the present invention.

FIG. 5 showing a first embodiment of the present invention.

In the present embodiment, for example, two sides (in the diagram, left and right sides) of a reference frame (referred to as a metrology frame) 20 of rectangular solid shape less susceptible to environmental effects are located at the positions of an X-ray source 12 and the X-ray detector 14 with the rotating table 16 interposed therebetween. A displacement meter 22 for detecting the displacement of a target 12A of the X-ray source 12 in an X-axis direction and three displacement meters 24A, 24B, and 24C for detecting the displacements of various portions (top and both left and right ends) of the X-ray detector 14 are fixed to the metrology frame 20. The positions and orientations of the X-ray source 12 and the X-ray detector 14 are thereby detected with reference to the metrology frame 20. Displacement meters can be added to detect the displacement of the target 12A in Y- and Z-axis directions as well.

The displacement meters 22, 24A, 24B, and 24C detect position data and orientation data that can change during a CT scan. The effect of the changes can be reduced by using such data during CT reconstruction processing.

Figure 6:
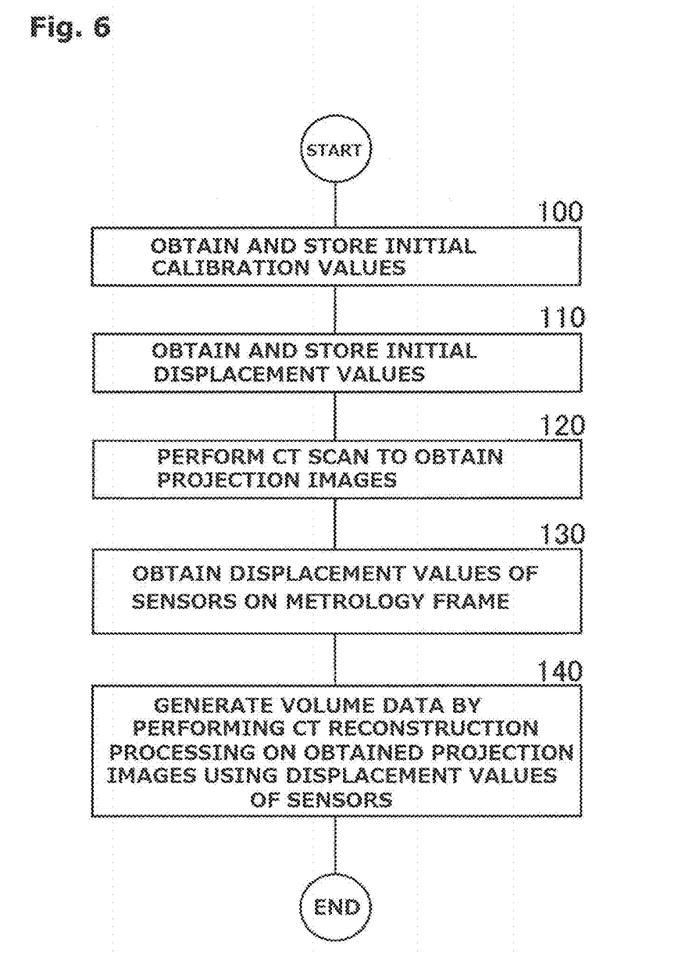
FIG. 6 is a flowchart showing an example of a processing procedure according to the present invention.

Specifically, as shown in FIG. 6, in step 100, the values of parameters indicating a geometrical positional relationship between the focus of the x-ray source 12, the X-ray detector 14, and the rotating table 16 of the measurement X-ray CT apparatus 1 are initially calibrated. The values are then stored as initial calibration values.

At the same time, in step 110, displacement values of the displacement meters 22, 24A, 24B, and 24C that are the sensors on the metrology frame 20 are obtained and stored as initial displacement values.

In step 120, a work 10 is placed on the rotating table 16 and then irradiated with an X-ray beam 13 to perform a CT scan, whereby a plurality of (for example, 800) projection images are obtained.

In the meantime, in step 130, the displacement values of the sensors on the metrology frame 20 are obtained when each projection image is obtained (for example, 800 pieces of data).

In step 140, the initial calibration values, the initial displacement values, and the displacement values of the sensors during the acquisition of the projection images are input to an arithmetic control unit as parameters of the CT reconstruction processing. Volume data is generated by performing the CT reconstruction processing on the obtained projection images.

In the CT reconstruction processing, high-quality volume data with reduced effect of geometrical positional changes during the CT scan can be generated by using the displacement values of the sensors during the acquisition of the projection images.

Figure 7:
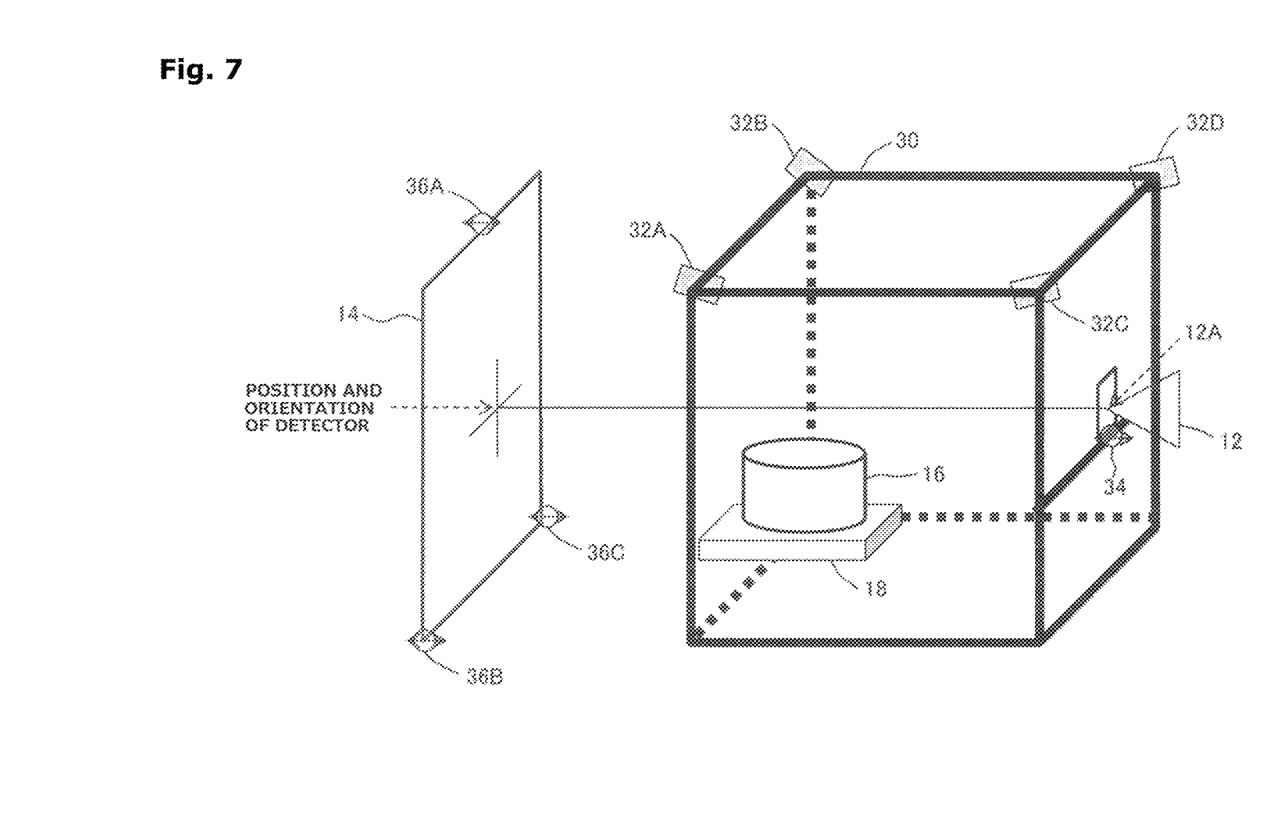
FIG. 7 is a perspective view showing a second embodiment of the present invention.

FIG. 7 shows a second embodiment of the present invention.

In the present embodiment, for example, two sides (in the diagram, left and right sides) of a metrology frame 30 that is a reference frame of cubic shape are located at the positions of an X-ray source 12 and a rotating table 16. A marker 34 disposed at the position of a target 12A of the X-ray source 12 is detected by cameras 32A and 32B disposed on both upper corners of the left side of the metrology frame 30. In the meantime, for example, three markers 36A, 36B, and 36C disposed on an X-ray detector 14 are detected by cameras 32C and 32D similarly disposed on both upper corners of the right side of the metrology frame 30.

Examples of the markers 34, 36A, 36B, and 36C include light-emitting diodes (LEDs).

In other respects, the second embodiment is the same as the first embodiment, and a description thereof will thus be omitted.

Note that the installation positions of the cameras 32A, 32B, 32C, and 32D on the metrology frame 30 are not limited to the foregoing.

A displacement meter 22 similar to that of the first embodiment may be used instead of the combination of the cameras 32A and 32B and the marker 34.

Figure 8:
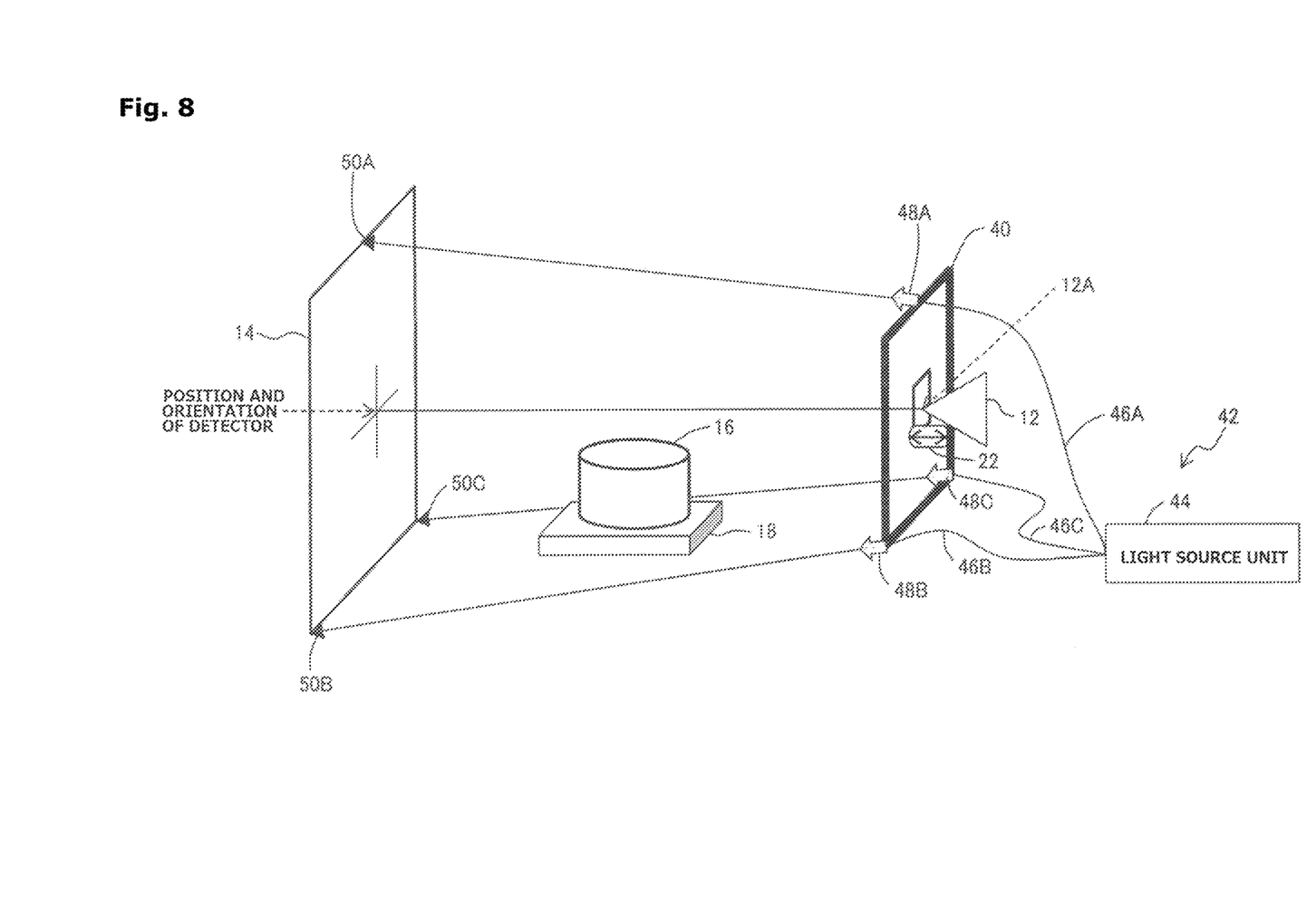
FIG. 8 is a perspective view showing a third embodiment of the present invention.

Next, a third embodiment of the present invention will be described with reference to FIG. 8.

In the present embodiment, a metrology frame 40 that is a reference frame of square shape, for example, is disposed at the position of an X-ray source 12. For example, three laser interferometer emission units 48A, 48B, and 48C are disposed on the metrology frame 40, and detect the same number of, i.e., three corner cubes 50A, 50B, and 50C disposed on an X-ray detector 14.

A laser interferometer 42 includes a light source unit 44, light guide fibers 46A, 46B, and 46C, and the laser interferometer emission units 48A, 48B, and 48C attached to the metrology frame 40.

The position of a target 12A of the X-ray source 12 is detected, for example, by a displacement meter 22 similar to that of the first embodiment.

In other respects, the third embodiment is the same as the foregoing embodiments, and a description thereof will thus be omitted.

Figure 9:
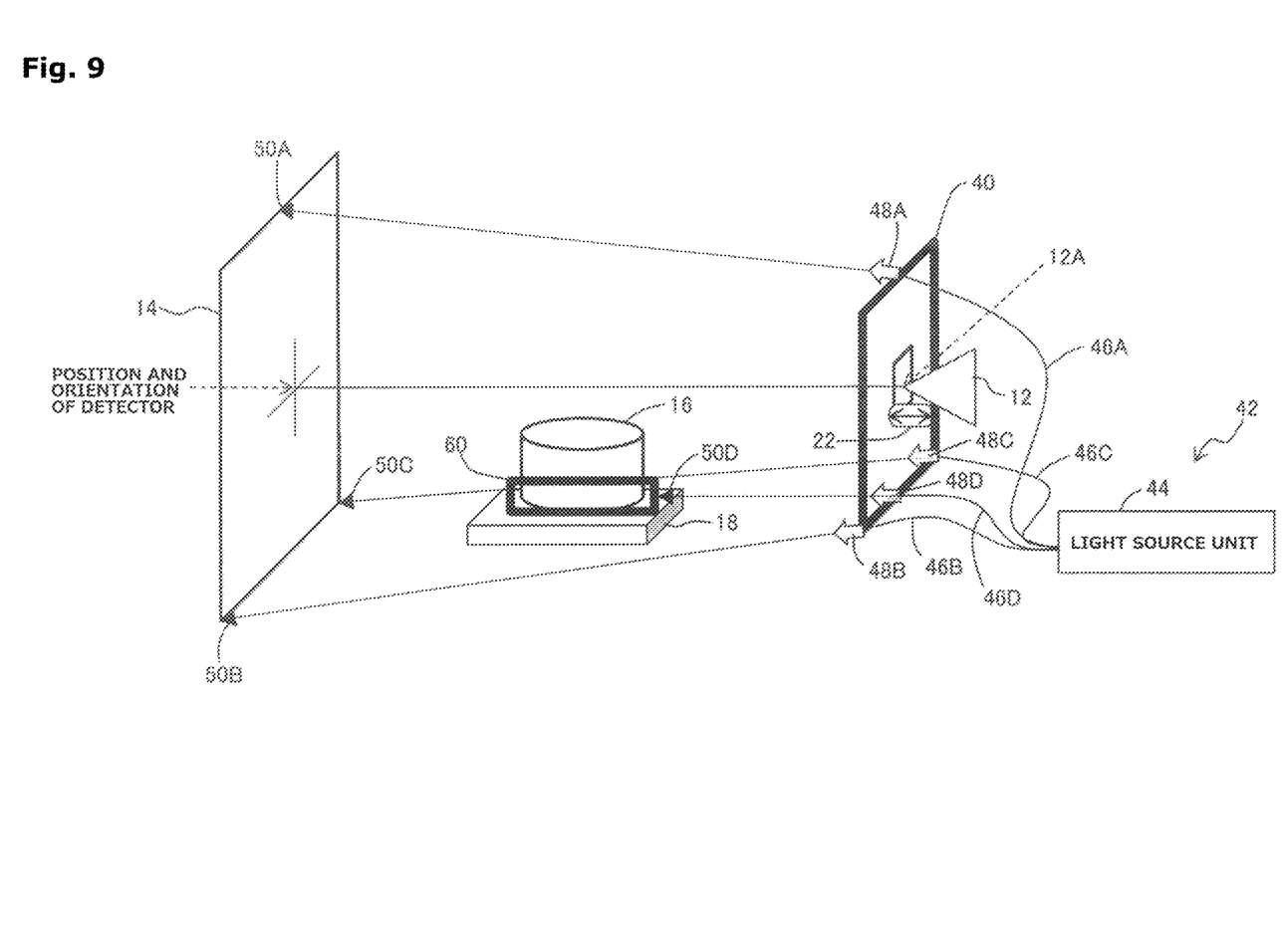
FIG. 9 is a perspective view showing a fourth embodiment of the present invention.

Next, a fourth embodiment of the present invention will be described with reference to FIG. 9.

The present embodiment is implementing by adding an eccentricity measuring device 60 for measuring the position and eccentricity of the rotating table 16 to the third embodiment.

Figure 10:
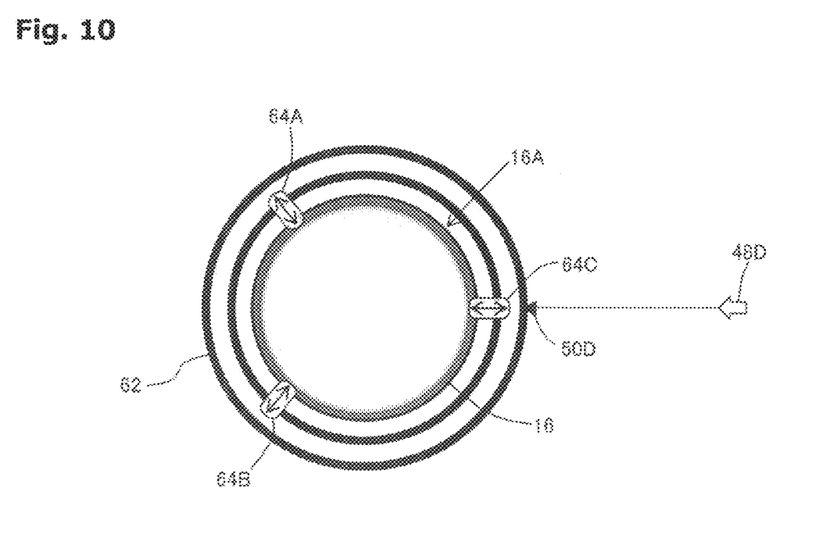
FIG. 10 is a plan view showing an eccentricity measuring device used in the fourth embodiment.
Figure 11:
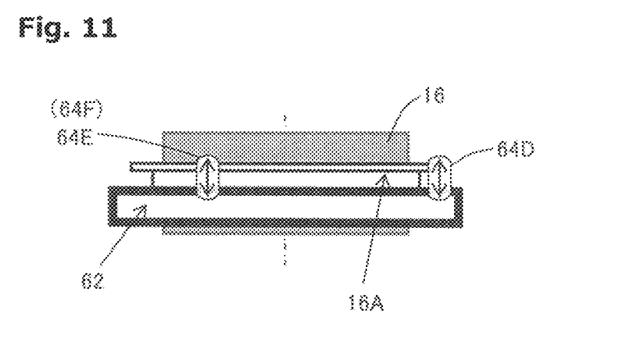
FIG. 11 is a side view of the same.

As shown in FIG. 10 (plan view) and FIG. 11 (side view), the eccentricity measuring device 60 includes an eccentricity measurement frame 62 and displacement meters 64A, 64B, 64C, 64D, 64E, and 64F (not shown) disposed thereon. A reference surface 16A (desirably having small deviation from roundness) is formed on the outer periphery of the rotating table 16, and the eccentricity measurement frame 62 is located on the outer periphery of the reference surface 16A. The displacement meters 64A to 64F have sensitivity in radial directions (FIG. 10) and an axial direction (FIG. 11), and more than one displacement meter is disposed in each direction. The eccentricity measuring device 60 thereby measures the displacement of the rotating table 16 in the radial and axial directions.

A distance from the metrology frame 40 to the eccentricity measuring device 60 is measured by detecting a corner cube 50D located on the eccentricity measuring device 60 using laser emitted from a laser interferometer emission unit 48D located on the metrology frame 40.

A non-measurement X-ray CT apparatus can be retrofitted with the configuration of the present embodiment to constitute a measurement X-ray CT apparatus.

Figure 12:
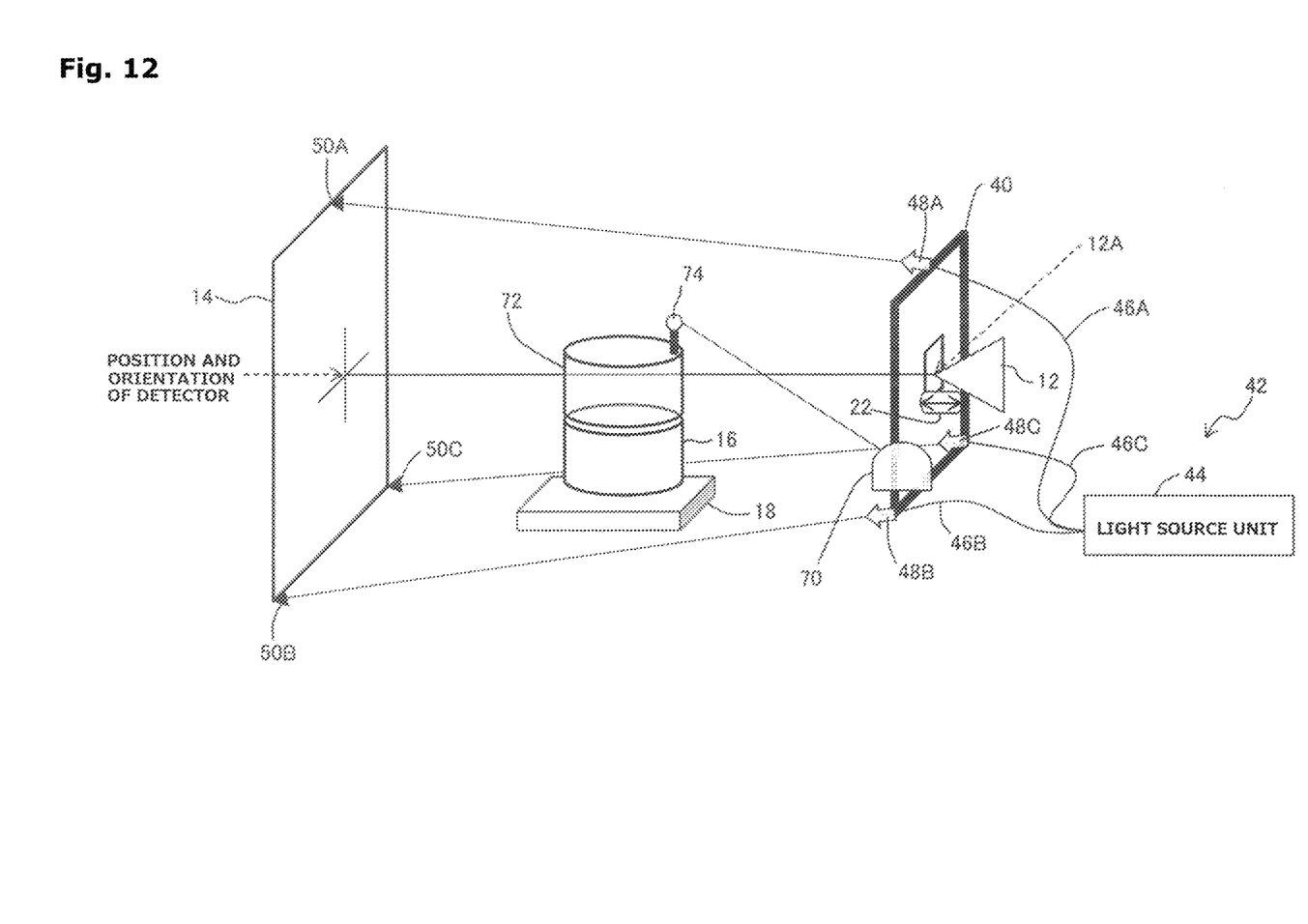
FIG. 12 is a perspective view showing a fifth embodiment of the present invention.

Next, a fifth embodiment of the present invention will be described with reference to FIG. 12.

In the present embodiment, the means for measuring the position and eccentricity of the rotating table 16 according to the fourth embodiment are replaced with a laser tracker 70 located on the metrology frame 40.

The laser tracker 70 measures the position and the eccentricity of the rotating table 16 by using a cat eye reflector 74 disposed on a measurement object fixing jig 72 of cylindrical shape, for example.

In other respects, the fifth embodiment is the same as the aforementioned embodiment. A description thereof will thus be omitted.

The foregoing embodiments have dealt with examples of combinations of a metrology frame and sensors. However, the combinations of a metrology frame and sensors are not limited thereto, and any combination may be used as appropriate. The types of markers are not limited to LEDs, either.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

The invention claimed is:

1. A measurement X-ray CT apparatus comprising:
   a rotating table configured to rotate about an axis and to accept an object to be measured to be placed thereon, and a scanning mechanism configured to move the rotating table to a given position in a measurement space region, the rotating table and the scanning mechanism being located between an X-ray source and an X-ray detector, the measurement X-ray CT apparatus being configured to calibrate a geometrical positional relationship between a focus of the X-ray source, the X-ray detector, and a rotation center of the rotating table in advance, obtain projection images by irradiating the object to be measured with X-rays to perform a CT scan, and generate a three-dimensional image of the object to be measured by CT reconstruction of the projection images, the measurement X-ray CT apparatus further comprising:
a reference frame that is made of a material and has a structure less susceptible to an environmental change; and
a sensor that is located on the reference frame and intended to successively obtain calibration values of the geometrical positional relationship between the focus of the X-ray source and the X-ray detector during the CT scan,
wherein the calibration values are used as parameters of the CT reconstruction.

2. The measurement X-ray CT apparatus according to claim 1, wherein the reference frame is disposed at positions of the X-ray source and the X-ray detector with the rotating table interposed therebetween.

3. The measurement X-ray CT apparatus according to claim 2, wherein the reference frame is a metrology frame of rectangular solid shape.

4. The measurement X-ray CT apparatus according to claim 1, wherein the reference frame is disposed at positions of the rotating table and the X-ray source, and a marker disposed on the X-ray detector is detected by a camera disposed on the reference frame.

5. The measurement X-ray CT apparatus according to claim 4, wherein the reference frame is a metrology frame of cubic shape.

6. The measurement X-ray CT apparatus according to claim 5, wherein the marker is a light-emitting diode.

7. The measurement X-ray CT apparatus according to claim 1, wherein the reference frame is disposed at a position of the X-ray source, and a corner cube disposed on the X-ray detector is detected by a laser interferometer disposed on the reference frame.

8. The measurement X-ray CT apparatus according to claim 1, further comprising:
an eccentricity measuring device disposed on the rotating table; and
a sensor configured to detect a position of the eccentricity measuring device, the sensor being disposed on the reference frame.

9. The measurement X-ray CT apparatus according to claim 8, wherein a reference surface for eccentricity measurement is formed on an outer periphery of the rotating table.

10. The measurement X-ray CT apparatus according to claim 1, further comprising a sensor configured to detect a position of the rotating table, the sensor being located on the reference frame.

11. The measurement X-ray CT apparatus according to claim 10, wherein the sensor is a laser tracker configured to detect a cat eye reflector disposed on a measurement object fixing jig on the rotating table.

* * * * *